R. E. BRÜNNOW.
RESILIENT WHEEL.
APPLICATION FILED MAR. 31, 1915.

1,168,157.

Patented Jan. 11, 1916.
2 SHEETS—SHEET 1.

WITNESSES:
George L. Blume.

INVENTOR
Rudolph E. Brünnow
BY
ATTORNEY

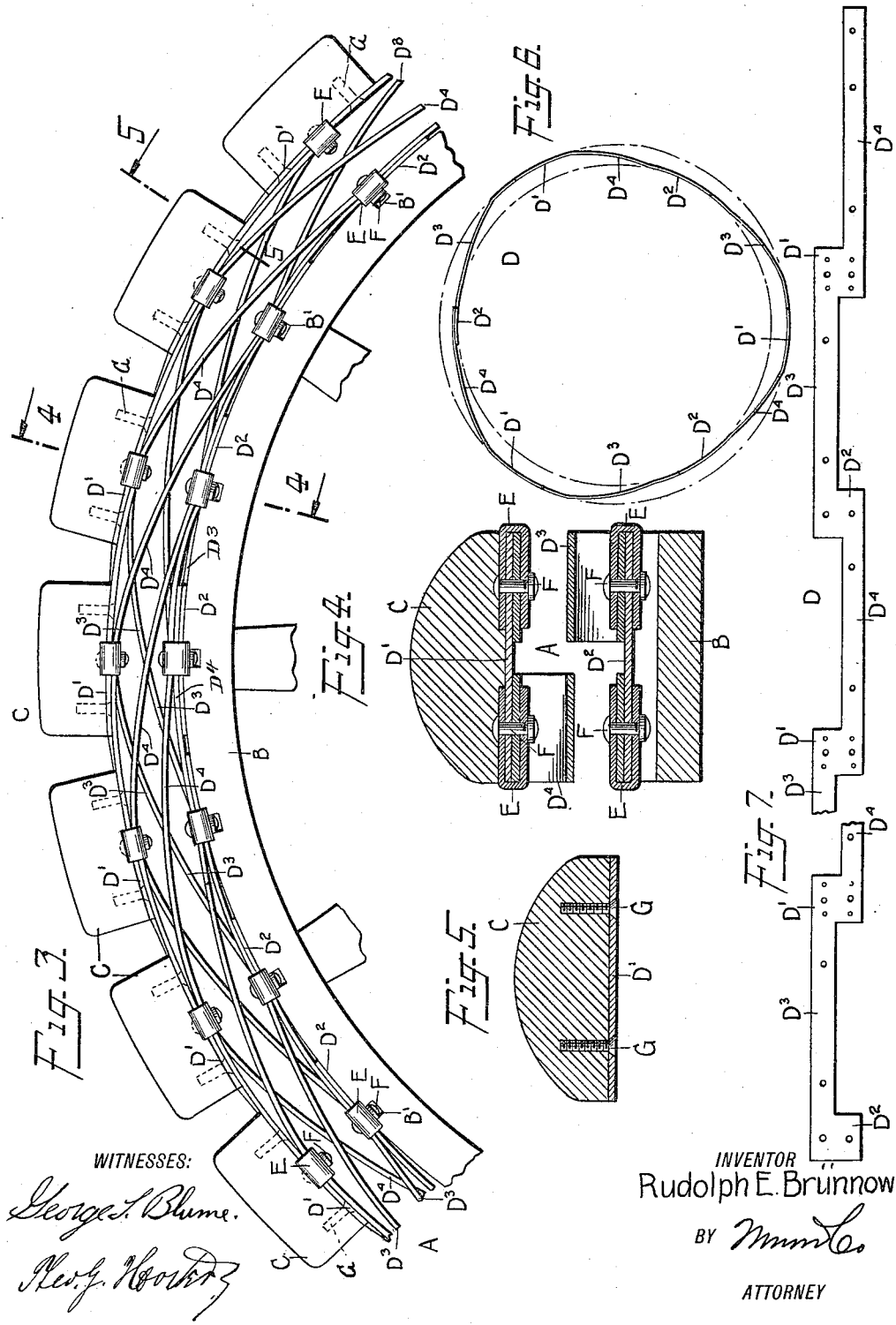

UNITED STATES PATENT OFFICE.

RUDOLPH ERNEST BRÜNNOW, OF PRINCETON, NEW JERSEY.

RESILIENT WHEEL.

1,168,157.  Specification of Letters Patent.  Patented Jan. 11, 1916.

Application filed March 31, 1915. Serial No. 18,271.

*To all whom it may concern:*

Be it known that I, RUDOLPH E. BRÜNNOW, a subject of the German Emperor, and a resident of Princeton, in the county of Mercer and State of New Jersey, have invented a new and Improved Resilient Wheel, of which the following is a full, clear, and exact description.

The object of the invention is to provide a new and improved resilient wheel for use on automobiles, auto trucks or other vehicles and arranged to dispense entirely with pneumatic tubes and similar devices now generally employed to obtain resiliency, and to provide a tire which can be cheaply manufactured, is simple and durable in construction and not liable to get out of order.

In order to accomplish the desired result, use is made of a tire formed of a plurality of springs, each in the form of a hoop extending around the wheel and each having inner rim portions, outer tread portions and connecting members connecting the said outer and inner portions with each other and alternately at opposite sides, each connecting member of one spring being connected near one end to the outer portion of another spring and at the other end to the inner portion of another spring.

A practical embodiment of the invention is represented in the accompanying drawings forming a part of this specification, in which similar characters of reference indicate corresponding parts in all the views.

Figure 1:
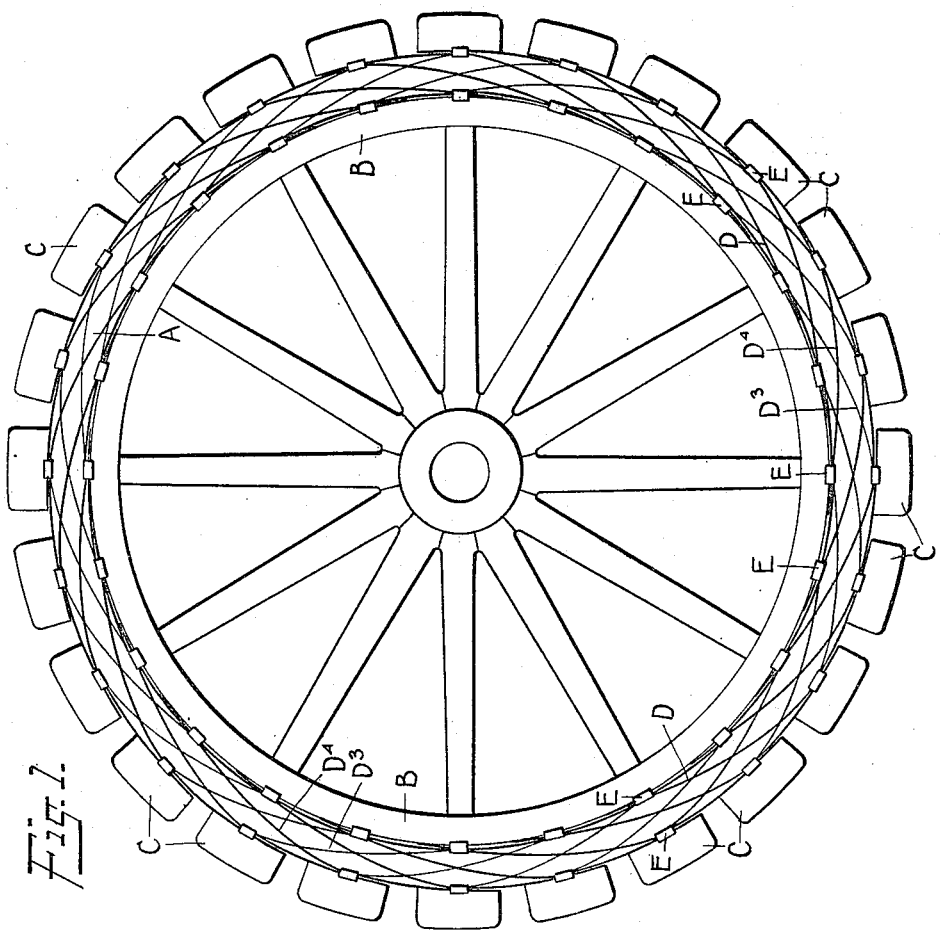
Figure 2:
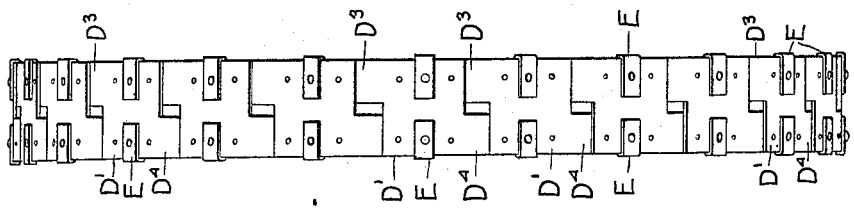

Figure 1 is a side elevation of the improved resilient wheel; Fig. 2 is an edge view of the same with the tread sections removed; Fig. 3 is an enlarged side elevation of a portion of the resilient wheel; Fig. 4 is an enlarged cross section of the same on the line 4—4 of Fig. 3; Fig. 5 is a similar view of the same on the line 5—5 of Fig. 3; Fig. 6 is a reduced side elevation of one of the springs; and Fig. 7 is an enlarged plan view of the same extended.

The improved tire A is detachably arranged on the peripheral face of the rim B of the wheel, and the tread is formed in sections C attached to the peripheral face of the tire A, as hereinafter more fully explained. The tire A is formed of a series of flat springs D all alike in shape and each being bent into hoop form to completely encircle the rim D and also to carry the tread sections C, the several springs being connected with each other to form a unitary structure. Each spring D consists of outer or tread portions D' carrying the tread sections C, inner rim portions $D^2$ in contact with the peripheral face of the rim B, and connecting members $D^3$ and $D^4$ connecting the tread portions with the rim portions alternately on opposite sides, as will be readily understood by reference to Fig. 7. One of the rim portions $D^2$ forms one end of the spring D and one of the connecting members $D^4$ forms the other end of the spring, and the terminal of this end connecting member overlies and is attached to the terminal rim portion (see Fig. 6). Each connecting member $D^3$ and $D^4$ of one spring extends near its outer end under the tread portion D' of another spring, and the inner end of each connecting member $D^3$, $D^4$ overlies the rim portions $D^2$ of another spring, so that each connecting member $D^3$ and $D^4$ is free to flex intermediate the corresponding tread portions and rim portions to which it is attached near its ends, as will be readily understood by reference to Fig. 4.

In order to fasten the contacting parts of the springs with each other, use is preferably made of U-shaped clips E and rivets F (see Figs. 3 and 4). The clips E are passed over the edges of the contacting portions of the springs and the rivets F extend through the clips and the contacting members to securely fasten the parts together. The clips E at the overlapping terminals of each spring are somewhat larger than the remaining clips to accommodate the said overlapping terminals and the corresponding portion of another spring. Each tread portion C is fastened by screws or other fastening devices G to the corresponding tread portion D' of a spring, as will be readily understood by reference to Fig. 5. The rim B is preferably provided at its peripheral face with transversely extending grooves B' to accommodate the bottom portions of the fastening devices E and the heads of the rivets F so as to hold the tire from creeping on the peripheral face of the rim B. By reference to Fig. 2, it will be noticed that the tread portions D' of the several springs are close together to accommodate a large number of tread sections C and in a like manner the rim portions $D^2$ are close together on the peripheral face of the rim B. By arranging the connecting members $D^3$, D⁴ out of longitudinal alinement, that is, on opposite sides of the portions D' and D², it is evident that the connecting members D³ and D⁴ can readily pass through the space between the corresponding tread and rim portions D', D² of another spring, and in practice, a number of connecting members D³ or D⁴ pass through such space between a tread portion D' and a rim portion D² of another spring. Thus the several springs are interlaced without interfering with the resilient action of the connecting members D³ and D⁴ of each spring. It will also be noticed that the connecting members D³ and D⁴ of a spring extend in opposite directions from a tread portion D' and toward the peripheral face of the rim with which the inner ends of the said connecting members D³, D⁴ are practically in tangential relation thus insuring the desired resilient action of the connecting members under varying loads and when the wheel is traveling over uneven surfaces.

As shown in Fig. 6, each spring D has three tread portions D' and a like number of rim portions D², but I do not limit myself to the number of such portions and corresponding connecting members as the same may be increased or diminished. It will also be noticed that the curvature given to the connecting members D³ and D⁴ may be more or less steep to increase or decrease the thickness of the tire, but in any event the tire is sufficiently resilient to insure an easy riding in a vehicle having wheels provided with the improved tires. It will further be noticed that as the springs D are all alike in construction they can be readily assembled and fastened together to form a resilient tire which is exceedingly strong and durable, cheap to manufacture and not easily liable to get out of order.

Suitable incasing means are employed to inclose the springs D with a view to prevent dirt and other extraneous matter from lodging between the springs forming the tire.

Having thus described my invention, I claim as new and desire to secure by Letters Patent:

1. In a resilient wheel, a tire formed of a plurality of springs each extending around the wheel and each having inner rim portions, outer tread portions, and connecting members connecting the said outer and inner portions with each other and alternately at opposite sides, each connecting member of one spring being connected near one end to the outer portion of another spring and at the other end to the inner portion of another spring.

2. In a resilient vehicle wheel, a tire formed of a plurality of springs each extending around the wheel and each having inner rim portions, outer tread portions, and connecting members connecting the said outer and inner portions with each other and alternately at opposite sides, each connecting member of one spring extending at its outer end under the adjacent outer portion of the next following spring and being secured thereto, and the inner end of each connecting member overlying the inner portion of another spring and being secured thereto.

3. In a resilient vehicle wheel formed of a plurality of connected flat springs each extending completely around the wheel and each having outer tread portions, inner rim portions and connecting members connecting the tread portions and rim portions with each other and alternately on opposite sides, one of the rim portions forming one end of the spring and one of the connecting members forming the other end of the spring, the terminal of this end connecting member being attached to the said terminal rim portion.

4. In a resilient vehicle wheel, a tire formed of a plurality of connected flat springs each extending completely around the wheel and each having outer tread portions, inner rim portions and connecting members connecting the tread portions and rim portions with each other and alternately on opposite sides, one of the rim portions forming one end of the spring and one of the connecting members forming the other end of the spring, the terminal of this end connecting member being attached to the said terminal rim portion, each connecting member of a spring being attached near its outer end to the adjacent tread portion of another spring and each connecting member being attached near its inner end to the rim portion of another spring.

5. In a resilient vehicle wheel, a tire formed of a plurality of connected flat springs each extending completely around the wheel and each having outer tread portions, inner rim portions and connecting members connecting the tread portions and rim portions with each other and alternately on opposite sides, one of the rim portions forming one end of the spring and one of the connecting members forming the other end of the spring, the terminal of this end connecting member being attached to the said terminal rim portion, each connecting member of a spring extending at its outer end under the tread portion of another spring and extending at the inner end over the rim portion of another spring, and fastening devices for fastening the outer and inner ends of each connecting member of one spring to the adjacent tread and rim portions of the other springs.

6. In a resilient vehicle wheel, a tire formed of a plurality of connected flat springs each extending completely around the wheel and each having outer tread portions, inner rim portions and connecting members connecting the tread portions and rim portions with each other and alternately on opposite sides, one of the rim portions forming one end of the spring and one of the connecting members forming the other end of the spring, the terminal of this end connecting member being attached to the said terminal rim portion, each connecting member of a spring extending at its outer end under the tread portion of another spring and extending at the inner end over the rim portion of another spring, fastening devices for fastening the outer and inner ends of each connecting member of one spring to the adjacent tread and rim portions of the other springs, a tread made in sections secured to the outer tread portions of the springs, and a rim on which rest the said rim portions of the springs, the said rim having transverse grooves to accommodate the under sides of the fastening devices at the said inner rim portions of the springs.

7. In a resilient vehicle wheel, a rim, a sectional tread and a tire formed of springs to which the tread sections are secured, each spring extending completely around the wheel and having the ends fastened together, each spring having alternate outer and inner portions, and connecting members connecting the outer and inner portions with each other and alternately on opposite sides, the outer portions carrying the said tread sections and the inner portions engaging the said wheel rim.

In testimony whereof I have signed my name to this specification in the presence of two subscribing witnesses.

RUDOLPH ERNEST BRÜNNOW.

Witnesses:
WALTER B. HOWE,
ELIZABETH CRITCHLOW.

Copies of this patent may be obtained for five cents each, by addressing the "Commissioner of Patents. Washington, D. C."